No. 649,329. Patented May 8, 1900.
J. MacDOUGALL.
PURIFICATION OF WATER.
(Application filed May 12, 1899.)
(No Model.) 2 Sheets—Sheet 2.
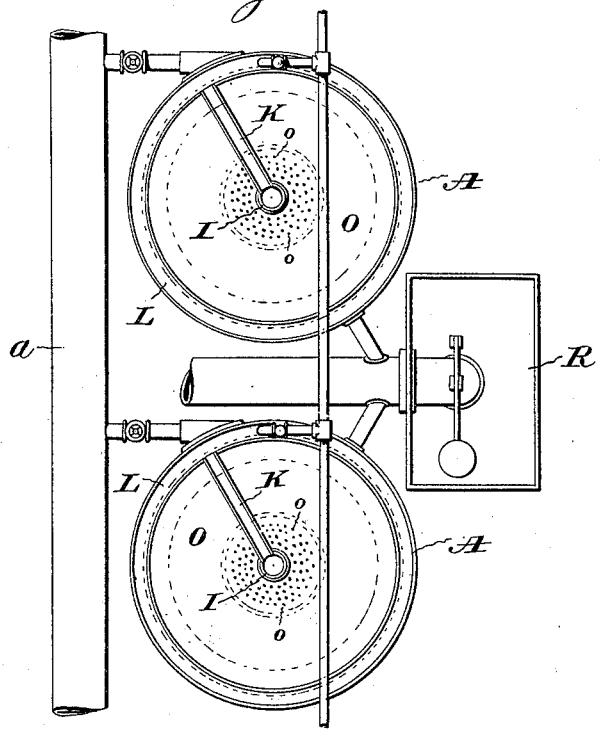
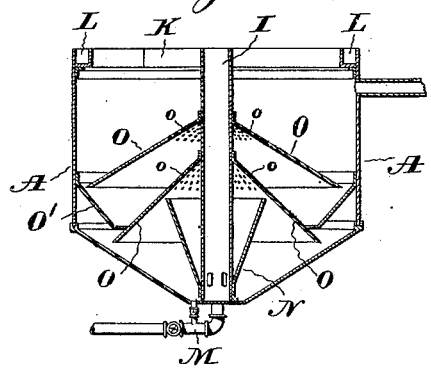

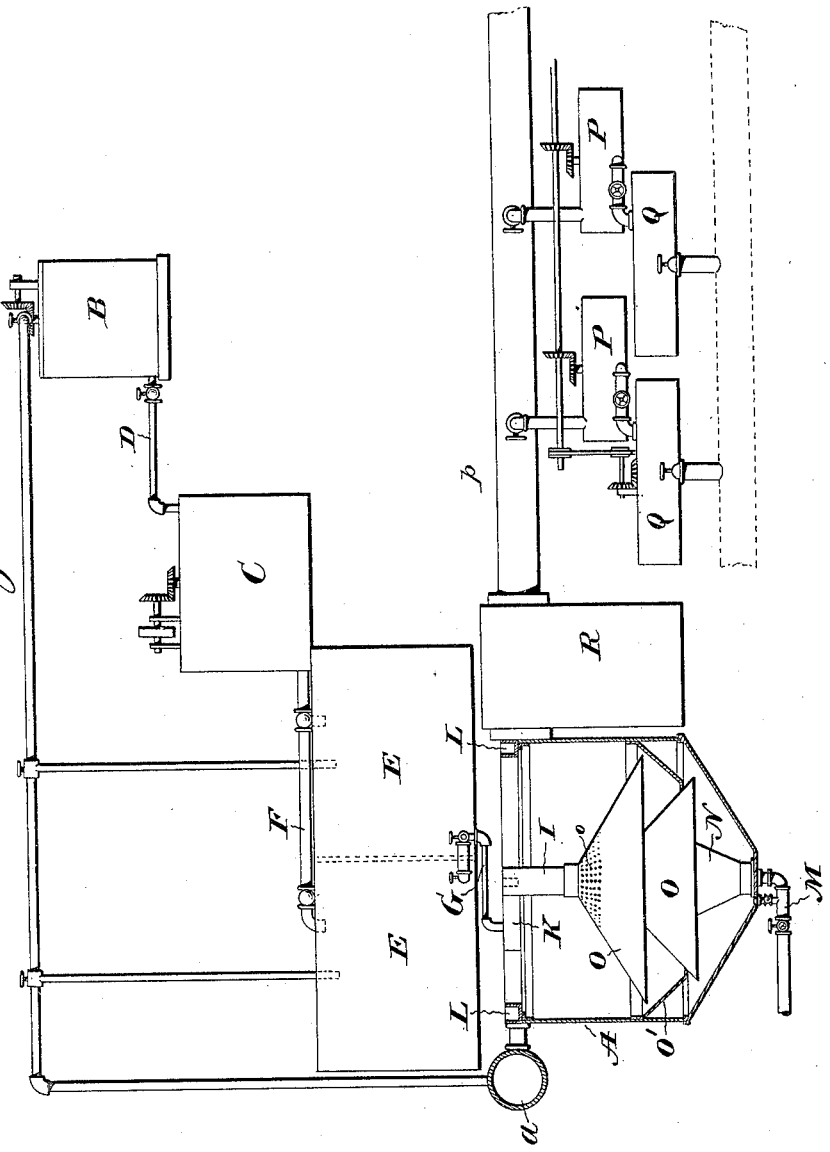

UNITED STATES PATENT OFFICE.

JOHN MacDOUGALL, OF DETROIT, MICHIGAN.

PURIFICATION OF WATER.

SPECIFICATION forming part of Letters Patent No. 649,329, dated May 8, 1900.

Application filed May 12, 1899. Serial No. 716,501. (No model.)

*To all whom it may concern:*

Be it known that I, JOHN MacDOUGALL, of Detroit, in the county of Wayne, and in the State of Michigan, have invented certain new and useful Improvements in Apparatus for the Purification of Water; and I do hereby declare that the following is a full, clear, and exact description thereof, reference being had to the accompanying drawings, in which—

Figure 1 is a view in side elevation, with parts in section, of a water-purifying plant embodying my invention. Fig. 2 is a top plan view showing two of the lime-treatment tanks, and Fig. 3 is a vertical section through one of said tanks.

Letters of like name and kind refer to like parts in each of the figures.

The object of my invention is to provide apparatus for the purification of water by which a maximum of purity shall be obtained, the treatment of the water be rapid, and the cost low; and to such end my invention consists in apparatus having the construction substantially as hereinafter specified.

My apparatus has been devised with especial reference to the treatment of water with lime, and I shall describe it in its adaptation for and use in such process, but with the premise that I do not restrict its adaptation and use to the practice of this or any other particular mode of or material for treatment.

The water to be treated is conducted from its source by a main *a* to one or more tanks A and A, into which the treating agent—in the present instance, lime—is introduced, the construction of said tanks being fully described hereinafter. The lime as delivered to the tanks is in the form of a hydrate or milk of lime and is preferably the hydrate. For the production of the latter there is a tank B for slaking caustic lime and mixing it with water, a tank C, connected by a pipe D with the tank B, for diluting the mixture from the latter to form milk of lime, and a tank or tanks E and E, to which the milk of lime is conveyed by a pipe F and which are supplied with water, so that the hydrate is formed therein, the water and milk of lime being in such proportions as to produce a completely-saturated solution. The hydrate from the tanks E and E is conveyed to the lime-treatment tanks A and A by suitably-valved piping G. There are preferably two tanks E and E for the production of the hydrate for the tanks A and A, so that while the solution is being drawn off from one it can be in course of preparation in the other, and thus a constant supply of the hydrate provided.

Each of the treatment-tanks A and A has preferably a cylindrical upper portion and a conical lower portion, and within it, at the center thereof, is a vertical pipe I, that at its upper end is connected by a radial channel K with a circular channel L at the top of the tank, into which the water to be treated and the hydrate are introduced and, flowing around the same, are conveyed into the pipe I through the channel K. By the provision of the circular channel there can be thorough commingling of the water and hydrate by the time they are delivered into the pipe I. At or near its lower end the pipe I has a number of outlet-holes *i* and *i* in its side leading into the tank at or near the bottom, and it communicates at its lower end with a pipe M for the purpose of discharging sediment. The pipe M is also connected with the bottom of the tank outside of the pipe I for the removal of sediment. The object of giving the lower portion of the tank a conical form is to facilitate the removal of sediment by causing it to be directed by the inclined surfaces to the removal-pipe.

Around the lower portion of the pipe I is an inverted hollow cone N, and above the latter is a hollow cone O, whose lower end is below the upper end of the inverted cone N. The upper portion of the cone O has numerous small perforations *o* and *o*. By means of the inverted cone N the lime-treated water coming from the pipe I is directed up into the cone O and by the latter a large volume is deflected and caused to descend and move laterally. On emerging from the cone at its rim or edge it passes upward. By reason of the small perforations *o* and *o* small streams or currents pass through the upper part of the cone, and thus prevent the presence of a stagnant or quiescent body of water within the same, which would otherwise exist. The entire body of water is thus kept in motion. One or more cones similar to the cone O may be employed. As shown, there is one more, and there is also shown a cone O', which projects from the tank A into the space between the two cones O and O.

The lime introduced into the water breaks up the organic matters in solution therein and agglomerates the resultants and such particles of clay and other mineral matters and humus that may be in suspension in the water, which agglomerates are precipitated in the tank and in their precipitation involve and carry down bacteria and other matter in suspension. The cone O offering an obstacle to the flow of water arrests the matters in suspension, and thus facilitates and expedites their agglomeration by the action of the lime and their precipitation.

The size and number of the perforations $o$ and $o$ are such that though their combined area is sufficient to secure the object above stated, yet such area is not enough to permit more than a comparatively small portion of the water to pass directly through the upper part of the cone, the remainder or greater volume of the water being compelled to pass out of the cone around the lower end thereof. Besides preventing the presence of a stagnant body in the cone the effect of the numerous small streams flowing upward through the perforations is to induce an upward flow into the cone of the entire volume of water and cause the travel of water downward along the inner surface of the cone because of the limited quantity which can find outlet through said perforations. Such travel of water along and in contact with the inner or under surface of the cone is of material aid in causing the agglomeration and precipitation of the matters in suspension, and in this connection the use of a number of small openings $o$ and $o$ rather than one or a few large ones of equal area to the small openings is advantageous in that the cone-surfaces between the small openings $o$ and $o$ act to arrest the matters in suspension.

The rate of flow of water through the lime-treatment tank is regulated according to the quantity of matter in suspension and the quantity of impurities in solution.

From the lime-treatment tank the water is passed through a main $p$ to filters P and P, which by straining clarify it by the removal of suspended matters, bacteria, &c., which have not been previously eliminated. The great proportion of such matters is removed by precipitation in the lime-treatment tank, but a small percentage remains, which makes it desirable to employ the filters P and P. Before being delivered to the service-mains the water is passed through second filters Q and Q. For the production of a constant or uniform pressure or head on the water as delivered to the filters to insure a proper and regular supply thereto an equalizing-tank R is interposed between the first filters and the lime-treatment tank, into which the water flowing from the latter is delivered.

Having thus described my invention, what I claim is—

1. In apparatus for purifying water, a tank or receptacle having a deflector inclined downward and outward in the path of water, and perforated at its higher end for the passage of a relatively-small quantity of water and having an outlet at its lower end for the remainder of the water intercepted by the deflector, substantially as and for the purpose described.

2. In apparatus for purifying water, a tank or receptacle having a cone with its large end toward the inlet into the tank, water being free to emerge from the cone at the large end, and having its small end perforated for the passage of a quantity of water relatively smaller than that which can pass from the cone at the large end, substantially as and for the purpose described.

3. In apparatus for purifying water, a tank or receptacle having a cone with its large end toward the inlet into the tank, water being free to emerge from the cone at the large end, and having numerous small openings at its upper end, substantially as and for the purpose described.

4. In apparatus for purifying water, the combination of a tank or receptacle, a vertical pipe therein and a perforated cone around the pipe, above the pipe-outlet, substantially as described.

5. In apparatus for purifying water, the combination of a tank or receptacle, a vertical pipe therein, a perforated cone around the pipe, above the pipe-outlet, and a guide to direct water from said outlet into the cone, substantially as described.

6. In apparatus for purifying water, the combination of a tank or receptacle, a vertical pipe therein, a perforated cone around the pipe, above the pipe-outlet, and a flaring guide to direct water from said outlet into the cone, substantially as described.

7. In apparatus for purifying water, the combination of a tank or receptacle, a vertical pipe having a suitable outlet therein, a circuitous channel communicating with said pipe, and means for delivering water and a treating agent into said channel, substantially as described.

In testimony whereof I sign this specification in the presence of two witnesses.

JOHN MacDOUGALL.

Witnesses:
LOUIS G. KITTELBURG,
JARED P. BLISS.